United States Patent
Rajkotia et al.

(10) Patent No.: US 7,583,630 B2
(45) Date of Patent: Sep. 1, 2009

(54) METHOD AND SYSTEM FOR PROVIDING MOBILE STATION CONTROL OF DATA TRANSMISSION RATES IN A WIRELESS NETWORK

(75) Inventors: Purva R. Rajkotia, Plano, TX (US);
Sanjaykumar Kodali, Dallas, TX (US);
Chanakya Bandyopadhyay, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 591 days.

(21) Appl. No.: 11/111,273

(22) Filed: Apr. 21, 2005

(65) Prior Publication Data
US 2005/0288014 A1 Dec. 29, 2005

Related U.S. Application Data

(60) Provisional application No. 60/583,354, filed on Jun. 28, 2004.

(51) Int. Cl.
*H04W 4/00* (2006.01)
*H04J 11/00* (2006.01)
*H04B 7/216* (2006.01)
*H04B 7/00* (2006.01)

(52) U.S. Cl. ......... 370/329; 370/209; 370/335; 455/522

(58) Field of Classification Search ......... 370/208–210, 370/318, 329, 335, 341; 375/130, 140, 147; 455/522
See application file for complete search history.

(56) References Cited

U.S. PATENT DOCUMENTS

| | | | | |
|---|---|---|---|---|
| 6,137,840 A | * | 10/2000 | Tiedemann et al. | 375/297 |
| 6,208,873 B1 | * | 3/2001 | Black et al. | 455/522 |
| 2003/0223396 A1 | * | 12/2003 | Tsai et al. | 370/342 |

* cited by examiner

*Primary Examiner*—George Eng
*Assistant Examiner*—Wesley L Kim

(57) ABSTRACT

A method for providing mobile station control of data transmission rates in the wireless network is provided. The method includes transmitting data transmission rate (DTR) data from a base station to a mobile station. The DTR data comprises a first Walsh cover that is different from a second Walsh cover that identifies the base station. A DTR request is received from the mobile station at the base station. The DTR request comprises the first Walsh cover. A data transmission rate from the base station to the mobile station is reduced based on the DTR request.

20 Claims, 4 Drawing Sheets

METHOD AND SYSTEM FOR PROVIDING MOBILE STATION CONTROL OF DATA TRANSMISSION RATES IN A WIRELESS NETWORK

CROSS-REFERENCE TO RELATED APPLICATION AND CLAIM OF PRIORITY

The present invention is related to that disclosed in U.S. Provisional Patent No. 60/583,354, filed Jun. 28, 2004, entitled "Dynamic Data Rate Control by the Mobile Station on the EV-DV Systems." U.S. Provisional Patent No. 60/583,354 is assigned to the assignee of the present application. The subject matter disclosed in U.S. Provisional Patent No. 60/583,354 is hereby incorporated by reference into the present disclosure as if fully set forth herein. The present application hereby claims priority under 35 U.S.C. §119(e) to U.S. Provisional Patent No. 60/583,354.

TECHNICAL FIELD OF THE INVENTION

The present invention relates generally to wireless networks and, more specifically, to a method and system for providing mobile station control of data transmission rates in a wireless network.

BACKGROUND OF THE INVENTION

In IS2000 Rel-C, a forward packet data channel is used to transmit data at a high data rate from a base station to a mobile station, such as a cellular telephone. The base station assigns the packet data channel to the mobile station based on the operating conditions of the mobile station. If these operating conditions change, the mobile station may want to change the rate at which data is received on the packet data channel.

In conventional wireless networks, however, the base station controls the data rate for this communication. The mobile station has no control. Thus, if the mobile station becomes resource-constrained and cannot handle the data received on the packet data channel, the base station will assume that the mobile station is still able to process the data and will continue to send the data at a rate that is too high for the mobile station to handle. When the mobile station receives the data, the mobile station will not be able to process the data, with the result that the data will be lost.

For example, the mobile station may need to support RC10 operation, as well as F-SCH operation (the 1× packet data call). If the mobile station is supporting several applications, such as one or more phone services, the mobile station may experience MIPS limitations, memory limitations, and the like. These limitations may affect proper operation of the CDMA modem and reduce the sustained data rate of the modem. However, without the ability to control the data rate, the mobile station has no way to continue to support the RC10 operation.

Therefore, there is a need in the art for improved wireless networks that allow mobile stations to control the data transmission rate on the forward packet data channel. In particular, there is a need for a wireless network that is able to provide base stations that allow mobile stations to request a reduction in the data transmission rates on the packet data channels and to provide mobile stations that are able to request such a reduction when the current data transmission rates become unsustainable.

SUMMARY OF THE INVENTION

In accordance with the present invention, a method and system for providing mobile station control of data transmission rates in a wireless network are provided that substantially eliminate or reduce disadvantages and problems associated with conventional methods and systems.

To address the above-discussed deficiencies of the prior art, it is a primary object of the present invention to provide a method for providing mobile station control of data transmission rates in a wireless network. According to an advantageous embodiment of the present invention, the method comprises transmitting data transmission rate (DTR) data from a base station to a mobile station. The DTR data comprises a first Walsh cover that is different from a second Walsh cover that identifies the base station. A DTR request is received from the mobile station at the base station. The DTR request comprises the first Walsh cover. A data transmission rate from the base station to the mobile station is reduced based on the DTR request.

According to one embodiment of the present invention, the DTR request further comprises a set channel quality indicator (CQI) value.

According to another embodiment of the present invention, the set CQI value comprises 0000.

According to still another embodiment of the present invention, the DTR data further comprises a specified CQI value and the DTR request further comprises the specified CQI value.

According to yet another embodiment of the present invention, the DTR request is received from the mobile station for a set duration.

According to a further embodiment of the present invention, the set duration comprises four CQI intervals, a CQI interval comprising a period of time associated with a CQI message transmitted from the mobile station to the base station.

According to a still further embodiment of the present invention, the DTR data further comprises a specified duration and the DTR request is received from the mobile station for the specified duration.

According to a yet further embodiment of the present invention, a packet data channel is assigned to the mobile station and the data transmission rate corresponds to data communicated from the base station to the mobile station on the packet data channel.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
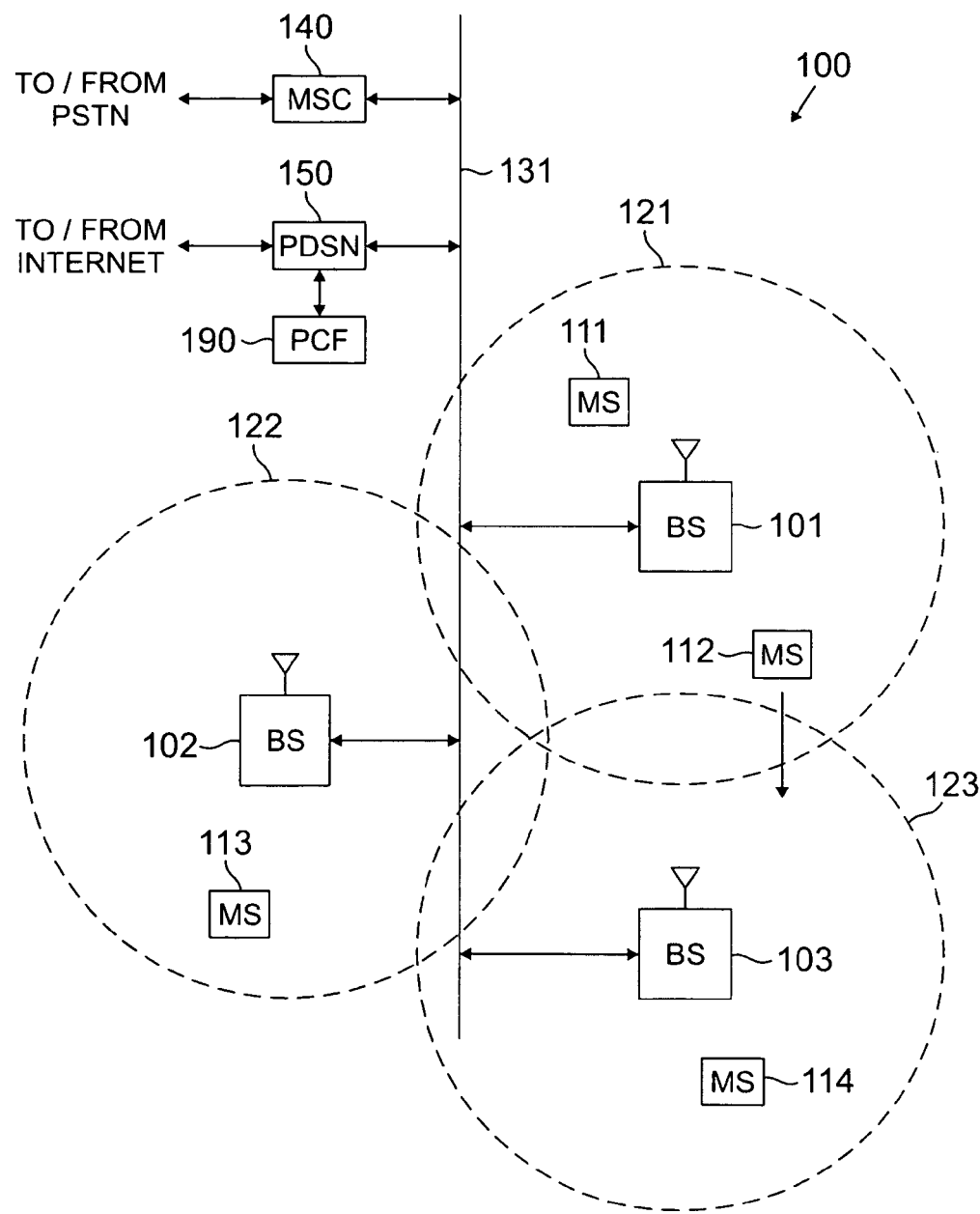
FIG. 1 illustrates an exemplary wireless network that is capable of providing mobile station control of data transmission rates according to the principles of the present invention.

FIG. 1 illustrates an exemplary wireless network 100 that is capable of providing mobile station control of data transmission rates according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

According to the principles of the present invention, wireless network 100 and at least some of mobile stations 111-114 are capable of controlling data transmission rates for data received from at least some of base stations 101-103 on packet data channels. For the purposes of simplicity and clarity in explaining the operation of the present invention, it shall be assumed in the following example that mobile station (MS) 111 is communicating with base station (BS) 101 of wireless network 100. However, the descriptions that follow also apply to the remaining base stations and mobile stations in wireless network 100.

Initially, MS 111 is receiving data from BS 101 on a packet data channel. However, at some point, MS 111 determines that the transmission rate of the data is too high. For example, the processing power of MS 111 may be reduced such that MS 111 is no longer able to handle the same data transmission rate. MS ill then communicates to BS 101 that the transmission rate is too high. In response, BS 101 reduces the data transmission rate.

Figure 2:
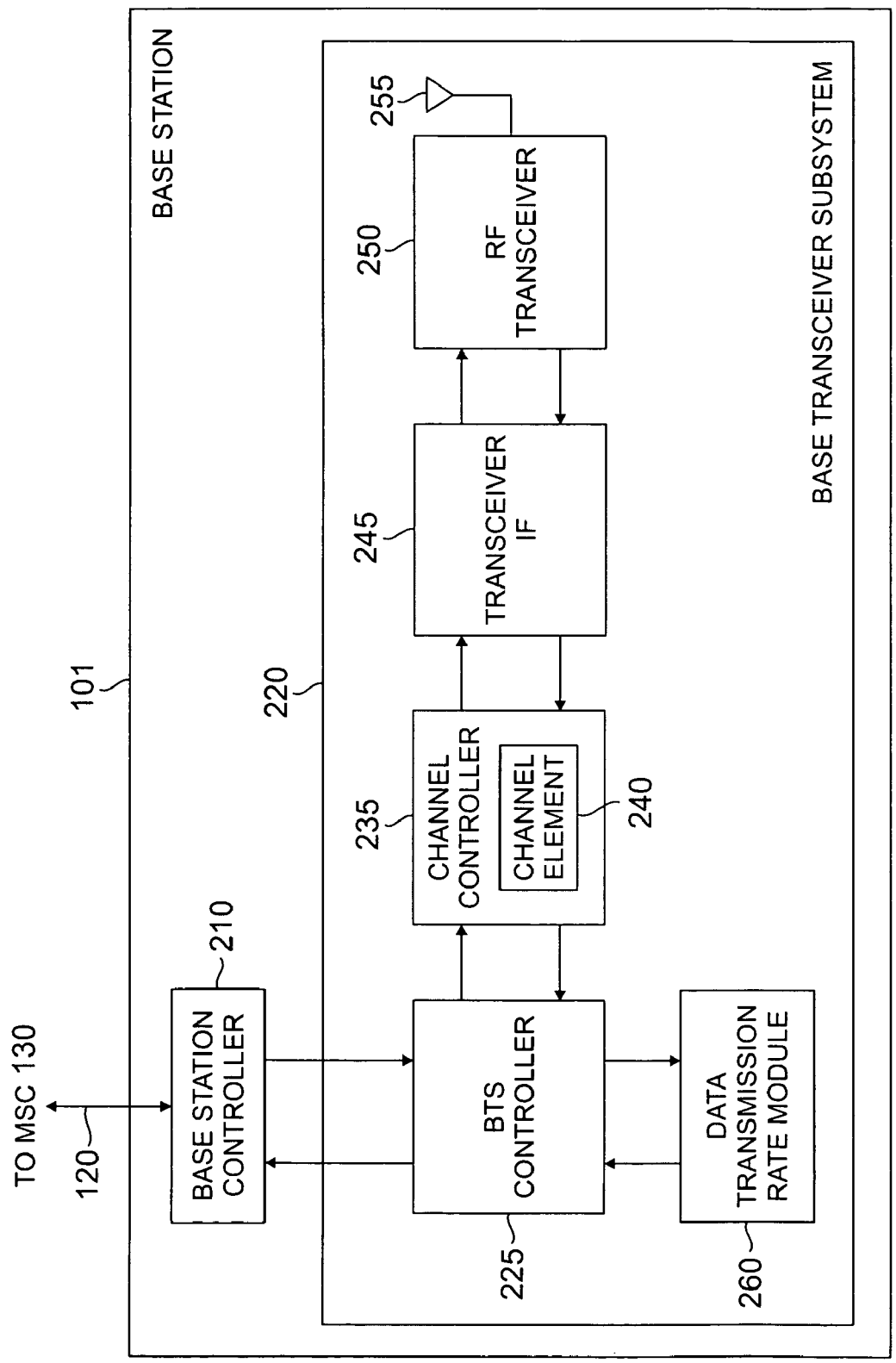
FIG. 2 illustrates an exemplary base station that allows mobile station-controlled data transmission rates according to the principles of the present invention.

FIG. 2 illustrates base station 101 in greater detail according to one embodiment of the present invention. Base station (BS) 101 is illustrated by way of example only. However, it will be understood that the components illustrated and described with respect to BS 101 are also part of base stations 102 and 103.

Base station (BS) 101 comprises base station controller (BSC) 210 and at least one base transceiver subsystem (BTS) 220, as previously described in connection with FIG. 1. Base station controller 210 manages the resources in cell site 121, including base transceiver subsystem 220. According to one embodiment, base transceiver subsystem 220 comprises base transceiver subsystem (BTS) controller 225, channel controller 235 (which may comprise at least one channel element 240), transceiver interface (IF) 245, radiofrequency (RF) transceiver unit 250, antenna array 255, and mobile station-controlled data transmission rate module 260.

BTS controller 225 may comprise processing circuitry and memory capable of executing an operating program that controls the overall operation of base transceiver subsystem 220 and communicates with base station controller 210. Under normal conditions, BTS controller 225 directs the operation of channel controller 235, which may comprise a number of channel elements, such as channel element 240, that are each operable to perform bidirectional communication in the forward channel and the reverse channel. A "forward channel" refers to outbound signals from the base station 101 to mobile stations 111 and 112 and a "reverse channel" refers to inbound signals from mobile stations 111 and 112 to base station 101. Transceiver IF 245 transfers bidirectional channel signals between channel controller 240 and RF transceiver unit 250.

Antenna array 255 transmits forward channel signals received from RF transceiver unit 250 to mobile stations in the coverage area of base station 101. Antenna array 255 is also operable to send to RF transceiver unit 250 reverse channel signals received from mobile stations in the coverage area of the base station 101. According to one embodiment of the present invention, antenna array 255 comprises a multi-sector antenna, such as a three-sector antenna in which each antenna sector is responsible for transmitting and receiving in a coverage area corresponding to an arc of approximately 120°. Additionally, RF transceiver unit 250 may comprise an antenna selection unit to select among different antennas in antenna array 255 during both transmit and receive operations.

Data transmission rate module 260 is operable to communicate data transmission rate (DTR) data to a mobile station, such as mobile station 111, that notifies mobile station 111 how to request a reduction in the data transmission rate. Data transmission rate module 260 is also operable to receive a DTR request from mobile station 111 and to reduce the data transmission rate in response to the DTR request.

For example, when base station 101 assigns a packet data channel to a mobile station, such as mobile station 111, that mobile station 111 sends channel quality indicator (CQI) information in the form of a CQI message to base station 101 on a reverse CQI channel at a specified CQI interval (e.g., every 1.25 msec). The CQI message may comprise either a full CQI value, which is an absolute value that is an estimate of the signal strength of base station's 101 pilot, or a differential CQI value, which is a positive or negative increment to adjust the previously transmitted CQI value(s). Differential CQI values are interpreted by base station 101 cumulatively such that the CQI estimate is determined by summing the most recent full CQI value with all differential CQI values that are received after that full CQI value.

Each transmission of a CQI message on the reverse CQI channel is directed to a pilot for a particular base station, such as base station 101, through the use of a distinct Walsh cover that is operable to identify that base station 101. Thus, the CQI message comprises both a Walsh cover and a CQI value, either full or differential.

The DTR request received from mobile station 111 comprises the CQI message with a modified Walsh cover and CQI value. Thus, in order to identify a DTR request from mobile station 111, data transmission rate module 260 of base station 101 sends DTR data to mobile station 111 that identifies a Walsh cover different from its own Walsh cover for mobile station 111 to use in any DTR request.

In addition, the DTR data may also comprise a specified duration corresponding to the amount of time mobile station 111 is to transmit the DTR request. This may be in the form of a specified period of time or a specified number of CQI intervals. Alternatively, all mobile stations 111-114 may use a set duration, such as four CQI intervals or other suitable duration. Finally, the DTR data may also comprise a specified CQI value to be used by mobile station 111 in the DTR request. Alternatively, all mobile stations 111-114 may use a set CQI value in a DTR request, such as 0000 or other suitable value.

When data transmission rate module 260 identifies a DTR request from mobile station 111 based on the receipt of a CQI message with the specified Walsh cover and the set or specified CQI value for the set or specified duration, data transmission rate module 260 prompts base station 101 to reduce the transmission rate of data being transmitted to mobile station 111 on the packet data channel.

Figure 3:
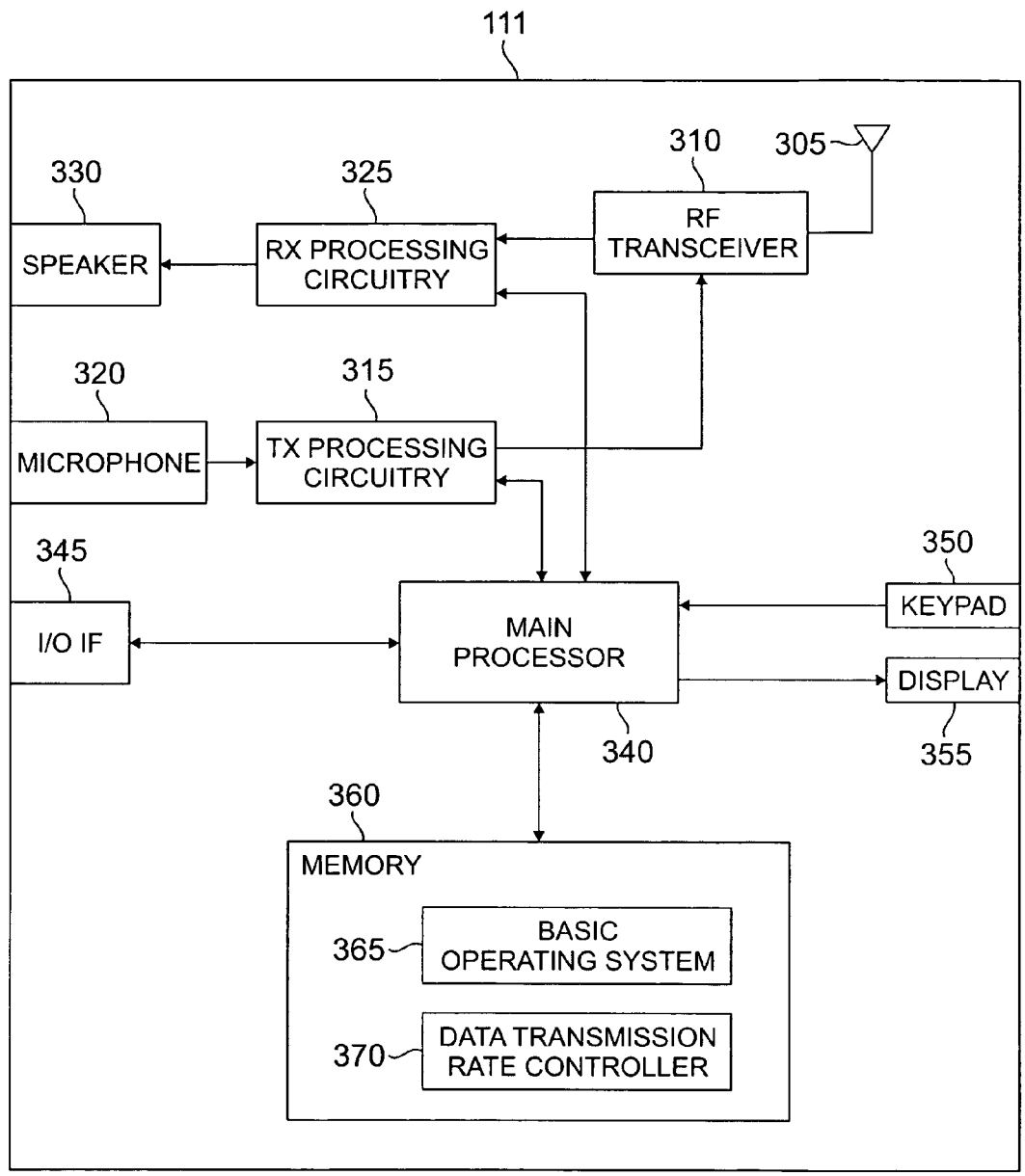
FIG. 3 illustrates an exemplary mobile station that is capable of controlling data transmission rates according to the principles of the present invention.

FIG. 3 illustrates mobile station 111 in greater detail according to one embodiment of the present invention. Mobile station (MS) 111 is illustrated by way of example only. However, it will be understood that the components illustrated and described with respect to MS 111 are also part of mobile stations 112-114. MS 111 comprises antenna 305, radio frequency (RF) transceiver 310, transmit (TX) processing circuitry 315, microphone 320, receive (RX) processing circuitry 325, and speaker 330. MS 111 also comprises main processor 340, input/output (I/O) interface (IF) 345, keypad 350, display 355, lagging feature (LF) button 358, and memory 360.

RF transceiver 310 receives from antenna 305 an incoming RF signal transmitted by BS 101. RF transceiver 310 down-converts the incoming RF signal to produce an intermediate frequency (IF) or a baseband signal. The IF or baseband signal may be sent to receiver processing circuitry 325, which produces a processed baseband signal by filtering, decoding, and/or digitizing the baseband or IF signal. Receiver processing circuitry 325 is also operable to transmit the processed baseband signal to speaker 330 (e.g., when the processed baseband signal comprises voice data) or to main processor 340 for further processing (e.g., when the processed baseband signal relates to web browsing).

Transmitter processing circuitry 315 receives analog or digital voice data from microphone 320 or other outgoing baseband data (e.g., web data, e-mail, interactive video game data and the like) from main processor 340. Transmitter processing circuitry 315 encodes, multiplexes and/or digitizes the outgoing baseband data to produce a processed baseband or IF signal. RF transceiver 310 receives the outgoing processed baseband or IF signal from transmitter processing circuitry 315. RF transceiver 310 up-converts the baseband or IF signal to an RF signal that may be transmitted via antenna 305.

According to one embodiment, main processor 340 may comprise a microprocessor or microcontroller. Memory 360, which is coupled to main processor 340, may comprise a random access memory (RAM) and/or a read-only memory (ROM). Main processor 340 executes basic operating system program 365 stored in memory 360 in order to control the overall operation of mobile station 111. In one such operation, main processor 340 controls the reception of forward channel signals and the transmission of reverse channel signals by RF transceiver 310, receiver processing circuitry 325, and transmitter processing circuitry 315. Main processor 340 may also execute other processes and programs resident in memory 360. Main processor 340 may move data into or out of memory 360, as required by an executing process.

Memory 360 further comprises a data transmission rate controller 370. Data transmission rate controller 370 is operable to receive DTR data from a base station, such as base station 101. Data transmission rate controller 370 is also operable to determine that the data transmission rate is too high, to generate a DTR request based on the DTR data, and to send the DTR request to base station 101 in order to prompt base station 101 to reduce the data transmission rate.

For example, according to one embodiment, data transmission rate controller 370 receives from base station 101 the DTR data, which comprises a specified Walsh cover and which may comprise a specified CQI value and/or a specified duration. Subsequently, data transmission rate controller 370 determines that the transmission rate of data from base station 101 on the packet data channel is too high for mobile station 111 to process.

At this point, data transmission rate controller 370 generates the DTR request by generating a CQI message comprising the specified Walsh cover and the specified or set CQI value. Data transmission rate controller 370 then transmits the DTR request to base station 101 for the specified or set duration of time. For example, for a particular embodiment, data transmission rate controller 370 may generate a DTR request with the specified Walsh cover and a set CQI value of 0000 and send this DTR request to base station 101 for four CQI intervals. Based on the DTR request, base station 101 reduces the data transmission rate for data sent to mobile station 111 on the packet data channel.

Main processor 340 is also coupled to the I/O interface 345. I/O interface 345 provides mobile station 111 with the ability to connect to other devices, such as laptop computers, handheld computers and the like. I/O interface 345 provides a communication path between these accessories and main controller 340. Main processor 340 is also coupled to keypad 350 and display unit 355. The operator of mobile station 111 may use keypad 350 to enter data into mobile station 111. Display 355 may comprise a liquid crystal display capable of rendering text and/or graphics from websites. It will be understood that additional embodiments may use other types of displays.

Figure 4:
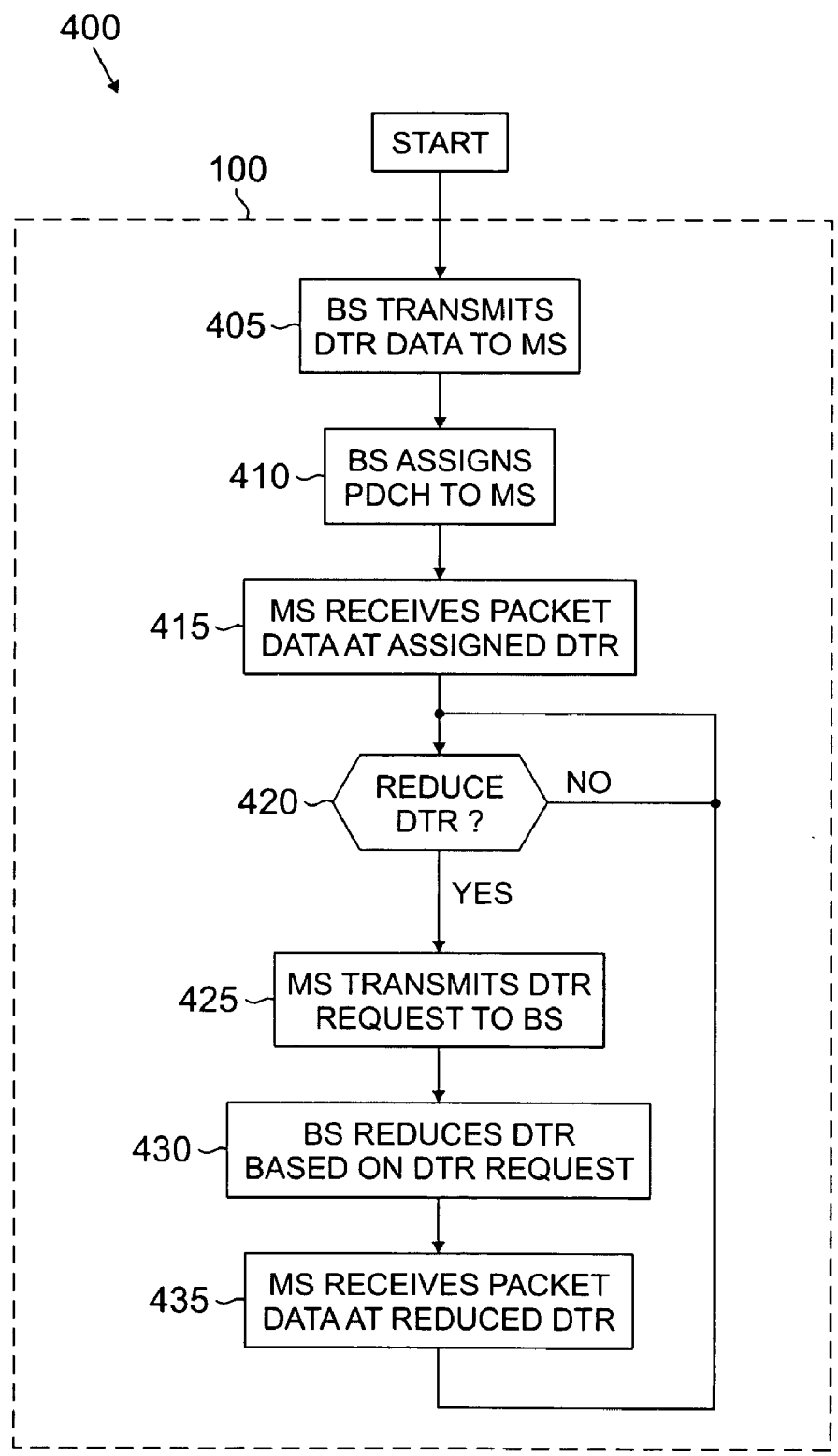
FIG. 4 is a flow diagram illustrating a method for providing mobile station control of data transmission rates in the wireless network of FIG. 1 according to the principles of the present invention.

FIG. 4 is a flow diagram illustrating a method 400 for providing mobile station control of data transmission rates in wireless network 100 according to the principles of the present invention. For the purposes of simplicity and clarity in explaining the operation of the present invention, it shall be assumed in the following example that mobile station (MS) 111 is communicating with base station (BS) 101 of wireless network 100. However, the descriptions that follow also apply to the remaining base stations and mobile stations in wireless network 100.

Initially, BS 101 transmits DTR data to MS 111 (process step 405). For one embodiment, the DTR data comprises a specified Walsh cover other than the Walsh cover corresponding to base station 101. The DTR data may also comprise a specified CQI value and/or a specified duration.

BS 101 assigns a packet data channel (PDCH), including a data transmission rate, to MS 111 for communicating packet data from BS 101 to MS 111 (process step 410). MS 111 then receives packet data from BS 101 on the packet data channel at the assigned data transmission rate (DTR) (process step 415).

MS 111 monitors its ability to handle the packet data received on the packet data channel at the assigned DTR and, if MS 111 determines that the DTR is too high (process step 420), MS 111 transmits a DTR request to BS 101 (process step 425). For example, data transmission rate controller 370 may generate a CQI message based on the DTR data received from BS 101 and send the CQI message as a DTR request for the specified or set duration to BS 101.

Data transmission rate module 260 of BS 101 recognizes the DTR request received from MS 111 and prompts BS 101 to reduce the DTR based on the DTR request (process step 430). MS 111 then receives packet data from BS 101 on the packet data channel at the reduced DTR (process step 435), after which MS 111 may continue to monitor its ability to handle the packet data at the reduced DTR (process step 420). In this manner, MS 111 is able to reduce the DTR in the middle of the call if MS 111 is resource-constrained, allowing MS 111 to continue to handle the data received on the packet data channel at a reduced rate instead of causing MS 111 to lose the data received at a higher rate.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network capable of communicating with a plurality of mobile stations in a coverage area of the wireless network, a method of providing mobile station control of data transmission rates in the wireless network, the method comprising the steps of:

transmitting data transmission rate (DTR) data from a base station to a mobile station, the DTR data comprising a first Walsh cover different from a second Walsh cover identifying the base station;

receiving a DTR request from the mobile station at the base station, the DTR request comprising the first Walsh cover; and reducing a data transmission rate from the base station to the mobile station based on the DTR request.

2. The method as set forth in claim 1, wherein the DTR request further comprises a set channel quality indicator (CQI) value.

3. The method as set forth in claim 2, wherein the set CQI value comprises the binary value 0000.

4. The method as set forth in claim 1, wherein the DTR data further comprises a specified CQI value and the DTR request further comprises the specified CQI value.

5. The method as set forth in claim 1, wherein the step of receiving the DTR request from the mobile station comprises the sub-step of receiving the DTR request for a set duration.

6. The method as set forth in claim 5, wherein the set duration comprises four CQI intervals, a CQI interval comprising a period of time associated with a CQI message transmitted from the mobile station to the base station.

7. The method as set forth in claim 1, wherein the DTR data further comprises a specified duration and the step of receiving the DTR request from the mobile station comprises the sub-step of receiving the DTR request for the specified duration.

8. The method as set forth in claim 1, further comprising the step of assigning a packet data channel to the mobile station, the data transmission rate corresponding to data communicated from the base station to the mobile station on the packet data channel.

9. For use in a wireless network capable of communicating with a plurality of mobile stations in a coverage area of the wireless network, a method of providing mobile station control of data transmission rates in the wireless network, the method comprising the steps of:

receiving from a base station data transmission rate (DTR) data at a mobile station, the DTR data comprising a first Walsh cover different from a second Walsh cover identifying the base station;

determining that a data transmission rate corresponding to data communicated from the base station to the mobile station is too high;

generating a DTR request comprising the first Walsh cover based on the determination that the data transmission rate is too high; and transmitting the DTR request to the base station.

10. The method as set forth in claim 9, wherein the DTR request further comprises a set channel quality indicator (CQI) value.

11. The method as set forth in claim 10, wherein the set CQI value comprises the binary value 0000.

12. The method as set forth in claim 9, wherein the DTR data further comprises a specified CQI value and the DTR request further comprises the specified CQI value.

13. The method as set forth in claim 9, wherein the step of transmitting the DTR request to the base station comprises the step of transmitting the DTR request to the base station for a set duration.

14. The method as set forth in claim 13, wherein the set duration comprises four CQI intervals, a CQI interval comprising a period of time associated with a CQI message transmitted from the mobile station to the base station.

15. The method as set forth in claim 9, wherein the DTR data further comprises a specified duration and the step of transmitting the DTR request to the base station comprises the sub-step of transmitting the DTR request to the base station for the specified duration.

16. The method as set forth in claim 9, wherein the data communicated from the base station to the mobile station is communicated on a packet data channel assigned to the mobile station by the base station.

17. For use in a wireless network capable of communicating with a plurality of mobile stations in a coverage area of the wireless network, a mobile station comprising a data transmission rate controller for providing mobile station control of data transmission rates in the wireless network, the data transmission rate controller operable to receive from a base station data transmission rate (DTR) data, the DTR data comprising a first Walsh cover different from a second Walsh cover identifying the base station, to determine that a data transmission rate corresponding to data communicated from the base station to the mobile station is too high, to generate a DTR request comprising the first Walsh cover based on the determination that the data transmission rate is too high, and to transmit the DTR request to the base station.

18. The mobile station as set forth in claim 17, the DTR data further comprising a set channel quality indicator (CQI) value.

19. The mobile station as set forth in claim 17, the DTR data further comprising a specified duration.

20. The mobile station as set forth in claim 19, the data transmission rate controller further operable to transmit the DTR request to the base station for the specified duration.

* * * * *

UNITED STATES PATENT AND TRADEMARK OFFICE
CERTIFICATE OF CORRECTION

PATENT NO. : 7,583,630 B2
APPLICATION NO. : 11/111273
DATED : September 1, 2009
INVENTOR(S) : Purva R. Rajkotia, Sanjaykumar Kodali and Chanakya Bandyopadhyay It is certified that error appears in the above-identified patent and that said Letters Patent is hereby corrected as shown below:

Column 5, line 22, delete "MS ill" and replace with --MS 111--.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,583,630 B2 Page 1 of 1
APPLICATION NO. : 11/111273
DATED : September 1, 2009
INVENTOR(S) : Rajkotia et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1089 days.

Signed and Sealed this

Fourteenth Day of September, 2010

David J. Kappos
*Director of the United States Patent and Trademark Office*